(12) United States Patent
Meng et al.

(10) Patent No.: US 11,150,398 B2
(45) Date of Patent: Oct. 19, 2021

(54) EDGE-LIT TYPE BACKLIGHT MODULE AND DISPLAY DEVICE

(71) Applicant: BOE Technology Group Co., Ltd., Beijing (CN)

(72) Inventors: Xiandong Meng, Beijing (CN); Xue Dong, Beijing (CN); Xiaochuan Chen, Beijing (CN); Jifeng Tan, Beijing (CN); Haiyan Wang, Beijing (CN); Wei Wang, Beijing (CN); Jian Gao, Beijing (CN); Wenqing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 19 days.

(21) Appl. No.: 16/013,692

(22) Filed: Jun. 20, 2018

(65) Prior Publication Data

US 2019/0101681 A1 Apr. 4, 2019

(30) Foreign Application Priority Data

Sep. 29, 2017 (CN) .......................... 201710909315.1

(51) Int. Cl.
*F21V 8/00* (2006.01)
(52) U.S. Cl.
CPC ........... *G02B 6/005* (2013.01); *G02B 6/0023* (2013.01); *G02B 6/0026* (2013.01); *G02B 6/0031* (2013.01)

(58) Field of Classification Search
CPC ........................ G02F 1/133615; G02B 6/0026
See application file for complete search history.

(56) References Cited

U.S. PATENT DOCUMENTS

| 10,274,665 | B2 * | 4/2019 | Kim ....................... G02B 27/01 |
|---|---|---|---|
| 2012/0044572 | A1 * | 2/2012 | Simmonds ........... G02B 6/0038 359/630 |
| 2016/0091648 | A1 * | 3/2016 | Bang ..................... G02B 6/005 362/607 |
| 2018/0172893 | A1 * | 6/2018 | Fattal ................... G02B 6/0035 |

* cited by examiner

*Primary Examiner* — Andrew J Coughlin
(74) *Attorney, Agent, or Firm* — McDermott Will & Emery LLP

(57) ABSTRACT

An edge-lit type backlight module and a display device are provided. The edge-lit type backlight module includes a light guide plate having a first surface and a second surface opposite to each other, as well as a first end and a second end opposite to each other, the first end and a second end having a distribution orientation parallel to the first surface; a light source disposed on the first surface of the light guide plate and being close to the first end of the light guide plate; a metal grating disposed on the second surface of the light guide plate, an orthographic projection of the metal grating on the first surface covering an orthogonal projection of the light source on the first surface.

18 Claims, 7 Drawing Sheets

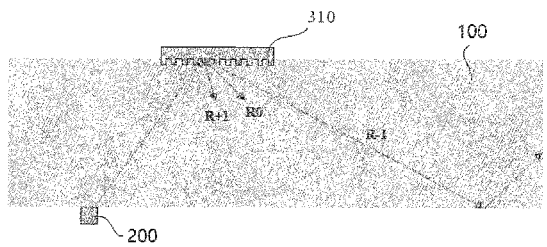
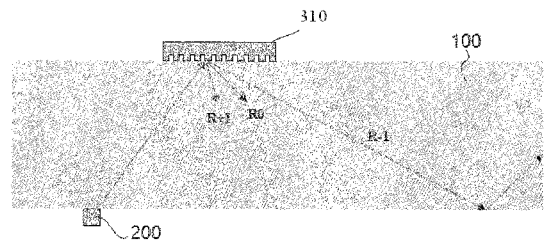
Fig. 7a   Fig. 7b
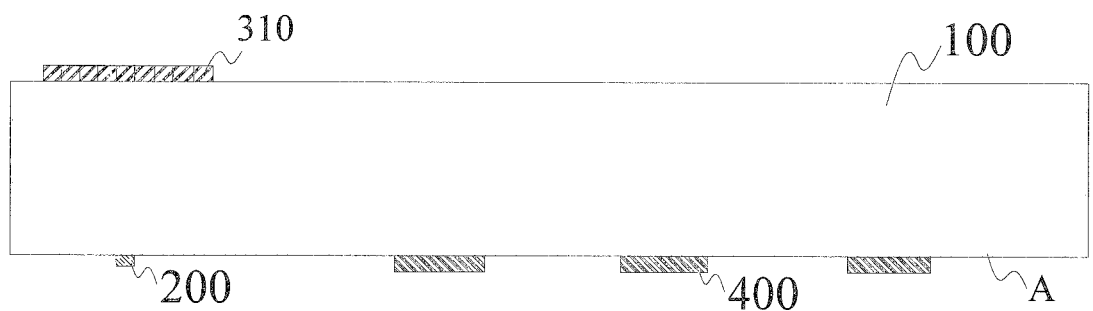
Fig. 8
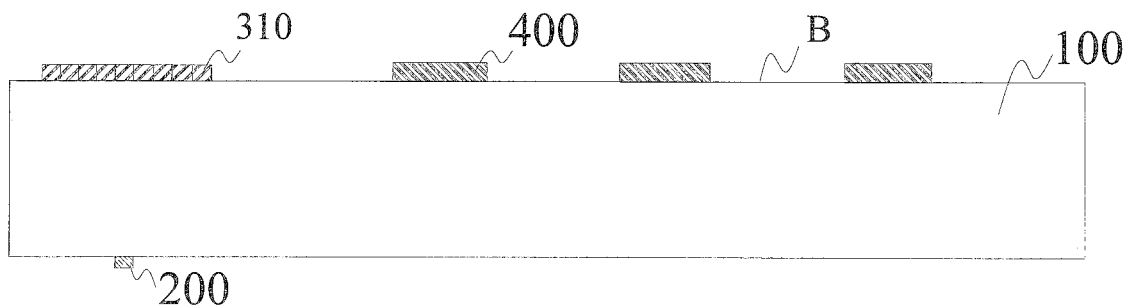
Fig. 9

EDGE-LIT TYPE BACKLIGHT MODULE AND DISPLAY DEVICE

CROSS-REFERENCE TO RELATED APPLICATION

This application claims the benefit of Chinese Patent Application No. 201710909315.1 filed on Sep. 29, 2017 in the State Intellectual Property Office of China, the whole disclosure of which is incorporated herein by reference.

TECHNICAL FIELD

The present disclosure relates to the field of display technology. Specifically, the present disclosure relates to an edge-lit type backlight module and a display device.

BACKGROUND

At present, in a backlight module of a display device structure, a media material with high refractive index is generally used for a coupling grating, a coupling efficiency of which is only about 20%, and a light utilization efficiency of which is low. In addition, the coupling grating modulates a LED light by diffraction to be incident into a light guide plate and such a light transmitted inside the light guide plate by total reflection herein could not be a uniform light (taken a case as an example in which a total reflection angle is 65°, the total reflection angle of the light within the light guide plate ranging from 57° to 76°), thereby resulting in a light output effect of a light output grating which may achieve a light with a certain divergence angle (for example, a light exit angle of the backlight module is ±7°), rather than a completely collimated light. If the light output by the light output grating has a certain divergence angle, a width of a light shielding layer arranged on the color filter substrate in one-to-one correspondence with respective position of the light output grating needs to be additionally increased, so that a part of the diffracted light is blocked and absorbed by the light shielding layer and fails to exit completely from sub-pixel areas, in turn resulting in a light energy loss. On the other hand, due to a process error, a light leakage may occur when the light shielding layer is arranged excessively high.

SUMMARY OF THE INVENTION

According to an aspect of the present disclosure, there is provided an edge-lit type backlight module, comprising: a light guide plate having a first surface and a second surface opposite to each other, a first end and a second end opposite to each other, the first end and a second end having a distribution orientation parallel to the first surface; a light source disposed on the first surface of the light guide plate and being close to the first end of the light guide plate; a metal grating disposed on the second surface of the light guide plate, an orthographic projection of the metal grating on the first surface covering an orthogonal projection of the light source on the first surface.

In an embodiment, the metal grating is made of aluminum metal.

In an embodiment, the metal grating comprises a plurality of metal sub-gratings disposed side by side in a same layer on the second surface of the light guide plate so as to obtain a uniform exit angle of the exit light of the metal grating.

In an embodiment, the plurality of metal sub-gratings are stepped gratings, a grating period, a step height, and a duty ratio of which are determined depending on the exit angle.

In an embodiment, a material having a same refractive index as that of the light guide plate is filled between steps of the metal sub-gratings.

In an embodiment, there is a gap between the adjacent steps of the metal sub-gratings.

In an embodiment, the exit angle of the metal grating ranges from about 61° ~75°, and a grating coupling efficiency of the metal grating ranges from about 35-56%.

In an embodiment, the edge-lit type backlight module further comprises a plurality of light output gratings disposed on the first surface at intervals or on the second surface at intervals.

In an embodiment, the light output gratings output the light transmitted by total reflection within the light guide plate in a light-output manner of a constant width light output or a convergent light output.

In an embodiment, each of the light output gratings comprises: a first sub-light output grating disposed close to the first end, and a minimum exit angle of the light exiting from an end of the first light output sub-grating close to the first end is no less than 0°; a second light output sub-grating disposed away from the first end, and a maximum exit angle of the light exiting from an end of the second light output sub-grating away from the first end is not greater than 0°.

In an embodiment, each of the light output gratings further comprises: a third light output sub-grating disposed between the first light output sub-grating and the second sub-light output grating.

In an embodiment, there is a gap between the second light output sub-grating and the first sub-light output grating.

In an embodiment, a difference between a width of a light shielding layer disposed corresponding to the light output grating and a width of the light output grating is no greater than 2 microns.

In an embodiment, the material of the light output grating is a transparent media material with a refractive index of about 2.0.

In an embodiment, the light source is a LED light source, and a thickness of the light guide plate is about 10 times the thickness of the LED light source.

In an embodiment, the edge-lit type backlight module further comprises a reflective layer disposed at the first end.

In an embodiment, the edge-lit type backlight module further comprises an absorber layer disposed on the first surface.

In an embodiment, the edge-lit type backlight module further comprises a filling layer covering the second surface of the light guide plate.

According to another aspect of the present disclosure, there is provided a display device, comprising the edge-lit type backlight module mentioned above.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The above and/or additional aspects and advantages of the present disclosure will become apparent and easily understood from the following description of embodiments in conjunction with the accompanying drawings, in which:

FIG. 7a is a schematic diagram of a diffracted optical path principle of respective light paths of a metal sub-grating according to an embodiment of the present disclosure, in which the metal sub-grating is a stepped grating;

FIG. 7b is a schematic diagram of a diffracted optical path principle of respective light paths of another metal sub-grating according to another embodiment of the present disclosure, in which the metal sub-grating is a stepped grating;

FIG. 8 is a schematic structural diagram of an edge-lit type backlight module according to another embodiment of the present disclosure, in which the edge-lit type backlight module includes a plurality of light output gratings disposed on the first surface at intervals;

FIG. 9 is a schematic structural diagram of an edge-lit type backlight module according to another embodiment of the present disclosure, in which the edge-lit type backlight module includes a plurality of light output gratings disposed on the second surface at intervals;

DETAILED DESCRIPTION OF PREFERRED EMBODIMENTS

The embodiments of the present disclosure are described in detail below, and it will be appreciated by those skilled in the art that the following embodiments are intended to explain the present disclosure and should not be construed as limiting to the present disclosure. Unless otherwise specified, those skilled in the art may perform processes according to commonly used technologies or conditions in the art or according to product specifications if relevant specific techniques or conditions are not explicitly described in the following examples.

According to the general inventive concept of the present disclosure, an edge-lit type backlight module is provided an edge-lit type backlight module, comprising: a light guide plate having a first surface and a second surface opposite to each other, a first end and a second end opposite to each other, the first end and a second end having a distribution orientation parallel to the first surface; a light source disposed on the first surface of the light guide plate and being close to the first end of the light guide plate; a metal grating disposed on the second surface of the light guide plate, an orthographic projection of the metal grating on the first surface covering an orthogonal projection of the light source on the first surface.

Figure 1:
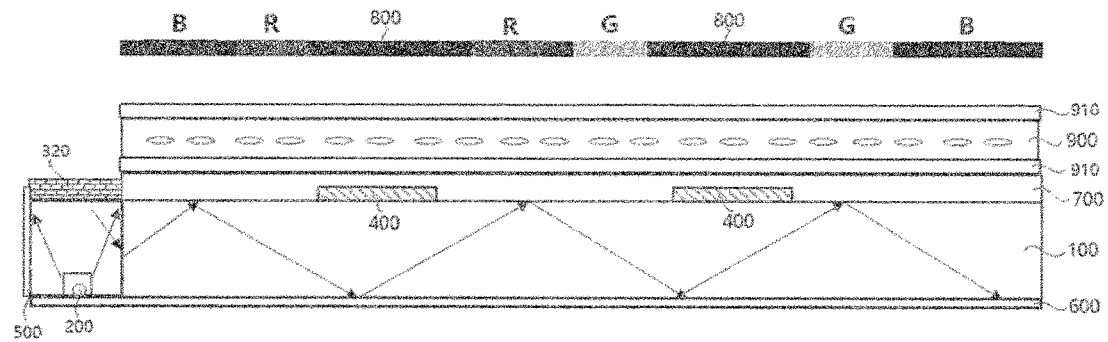
FIG. 1 is a schematic structural diagram of a display device of the related art related to optics.
Figure 2A:
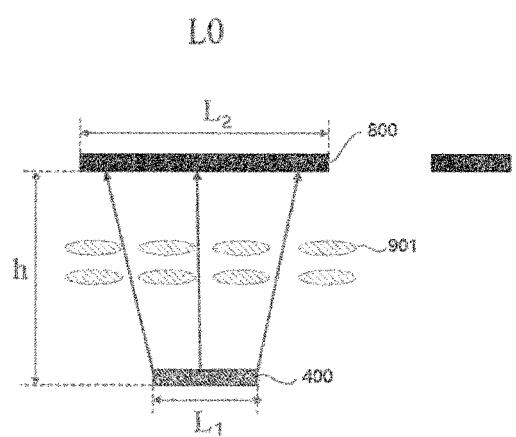
FIG. 2a is a schematic diagram showing a display principle of a liquid crystal layer of the related art in a dark state L0.
Figure 2B:
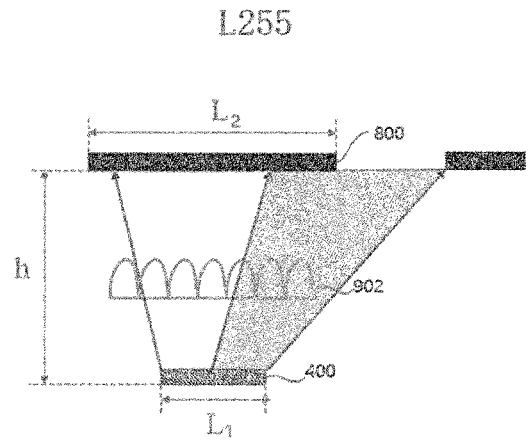
FIG. 2b is a schematic diagram showing a display principle of a liquid crystal layer of the related art in a bright state L255.

At present, a structure of a design optics in the display device of the related art is shown in FIG. 1, in which a media grating 320 modulates a Lambert reflector light of the LED light source 200 to be incident into the light guide plate 100 at a large angle and then the light transmits by total reflection within the light guide plate 100. A light output grating 400 is disposed on or under the light guide plate 100. The light output grating 400 outputs the light of a large angle propagating by total reflection in the light guide plate 100, at a collimated angle, thereby achieving a collimated light source with a high transmittance. Then, by means of an array of light shielding layers (also called Black Matrix, BM) 800 disposed above the light output grating 400, referring to FIG. 2a, the light shielding layer 800 generally absorbs collimated light and presents a dark state (L0); referring to FIG. 2b, when a bright state (L255) is presented, a set of voltage signals are applied to the liquid crystal layer 900, the liquid crystal thus forms a liquid crystal grating, and then the collimated light to exit therefrom exits after being diffracted by the liquid crystal grating. The liquid crystal grating has different diffraction efficiency for incident light by applying different voltage signals to the liquid crystal, thereby allowing a display with multiple gray scales.

In the related art, a material used in the media grating 320 of the backlight module is a media material with a high refractive index, which is actually a transmission grating. Only reflection-diffraction orders thereof are utilized, and therefore a coupling efficiency thereof is poor (about 20% or so). In order to improve the coupling efficiency, a specific number of steps of the grating should be increased. However, for a grating with a small period (wavelength order), the multi-step grating cannot be technically obtained for the time being.

The media grating 320 modulates the LED light by diffraction to be incident into the light guide plate 100. The light transmitted by total reflection within the light guide plate may not be a light with one single angle (for example, when a design angle of total reflection is about 65°, the angle of the light transmitted by total reflection within the light guide plate ranges from about 57°~76° due to light emitting characteristics of the LED, thereby resulting in a light outputting effect of the collimated light output grating which may achieve a light with a certain divergence angle, rather than a completely collimated light; with a simulation result of the light outputting effect having the light-exiting angle of +/−7°. In addition, referring to FIG. 2a, in order to ensure a relatively high liquid crystal luminous efficiency, the light shielding layer 800 needs to be arranged at a certain height h from the light output grating 400. Taken the number of pixels/resolution of 500 ppi as an example, in order to ensure a liquid crystal luminous efficiency of about 20%, a width $L_1$ of the light output grating 400 is 13 micrometers, a placement height h is 20.59 micrometers, and then a width $L_2$ of the finished light shielding layer 800 needs to be 19.16 micrometers (to ensure a dark state L0 and taking process error into account). In this way, referring to FIG. 2b, when being in the bright state L255, the exiting light should be modulated by diffraction at a maximum diffraction angle by the liquid crystal grating, so that the light exits with a maximum energy. However, since the width $L_2$ of the light shielding layer 800 is excessively large and a diffraction performance of the liquid crystal grating is limited, the diffracted light may not exit completely, a part of which will be blocked and absorbed by the light shielding layer 800, resulting in the loss of light energy.

Figure 3:
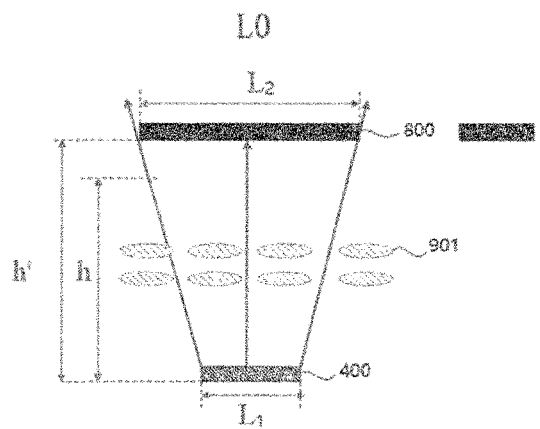
FIG. 3 is a schematic diagram of a principle of a light leakage problem in a light shielding layer of the related art.

In addition, compared with a preset placement height h of the light shielding layer 800 with respect to the light output grating 300, an actual placement height of the light shielding layer 800 with respect to the light output grating 300 is inevitably subject to process errors in the manufacturing process. Referring to FIG. 3, if the process error causes the actual placement height of the light shielding layer 800 to be higher than an allowable height h', a light leakage will easily occur in the dark state L0.

In one aspect of the present disclosure, the present disclosure proposes an edge-lit type backlight module. Referring to FIG. 4 to FIG. 17, the edge-lit type backlight module of the present disclosure will be described in detail.

Figure 4:
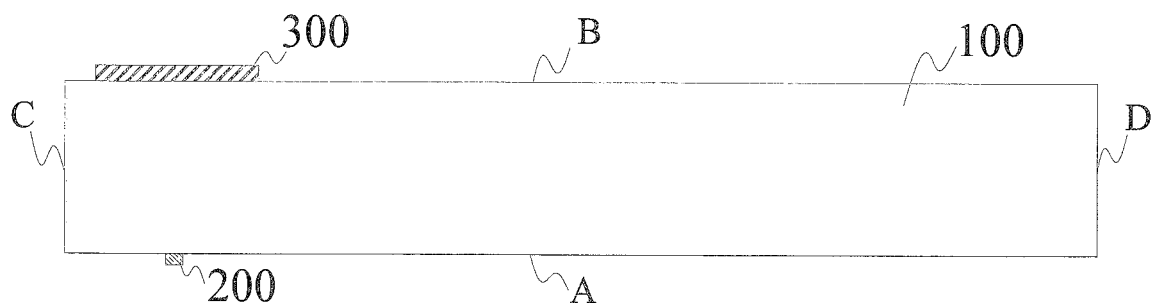
FIG. 4 is a schematic structural diagram of an edge-lit type backlight module according to an embodiment of the present disclosure.
Figure 5:
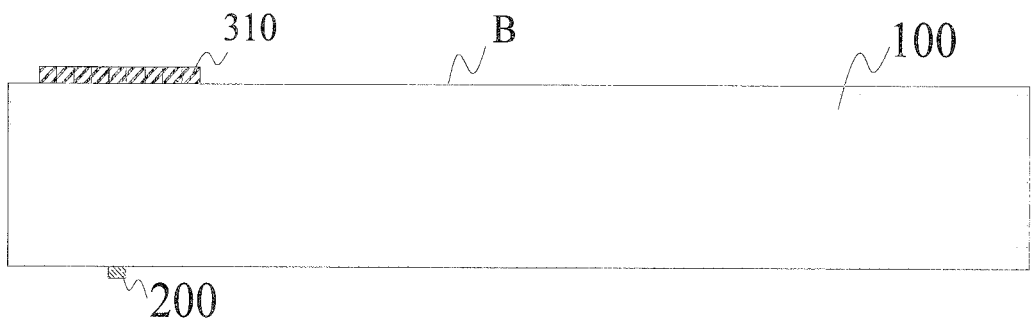
FIG. 5 is a schematic structural diagram of an edge-lit type backlight module according to another embodiment of the present disclosure, in which a metal grating includes a plurality of metal sub-gratings.
Figure 6:
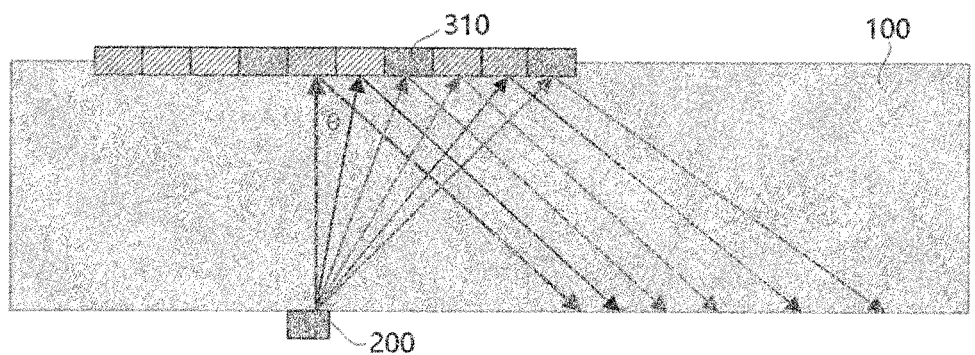
FIG. 6 is a schematic diagram of an optical path principle in which a plurality of metal sub-gratings cause same exit angle according to another embodiment of the present disclosure.

According to an embodiment of the present disclosure, referring to FIG. 4, the edge-lit type backlight module includes: a light guide plate 100, a light source 200, and a metal grating 300; the light guide plate 100 has a first surface A and a second surface B disposed opposite to each other, as well as a first end C and a second end D disposed opposite to each other. A distribution orientation of the first end C and the second end D is parallel to the first surface A. The light source 200 is disposed on the first surface A of the light guide plate 100 and is close to the first end C of the light guide plate 100; and the metal grating 300 is disposed on the second surface B of the light guide plate 100, and an orthogonal projection of the metal grating 300 on the first surface A covers an orthogonal projection of the light source 200 on the first surface A.

The material of the media grating of the related art generally is a transparent media material with a high refractive index, which is actually a transmission grating. Only the reflection-diffraction orders thereof are utilized, and therefore the coupling efficiency is poor (only about 20%). Therefore, in the embodiment of the present disclosure, a metal grating is used to replace the media grating, so that the light emitted by the light source is modulated by diffraction by the metal grating and then transmitted by total reflection in the light guide plate at a small angle, then the grating coupling efficiency may be doubled as compared with the use of a media grating of a media material with a high refractive index, thereby improving the luminous efficiency of the edge-lit type backlight module.

According to the embodiments of the present disclosure, the specific material of the metal grating 300 is not particularly limited, as long as the metal grating 300 of the material may diffract the light emitted by the light source 200 in a reflection manner, and may be selected according to a specific type of the light source 200 correspondingly. In some embodiments of the present disclosure, the metal grating 300 may be formed of metallic aluminum, so that the reflective diffraction effect of the metallic grating 300 is better and more efficient than the media grating.

According to the embodiments of the present disclosure, a specific structure of the metal grating 300 is also not particularly limited as long as the metal grating 300 of the structure may diffract the light emitted by the light source 200 in a reflection manner, and may be designed correspondingly according to a transmission route by total reflection that needs to be generated in the light guide plate 100. In some embodiments of the present disclosure, referring to FIG. 5 and FIG. 6, a metal grating may include a plurality of metal sub-gratings 310, and the plurality of metal sub-gratings 310 may be disposed side by side in a same layer on the second surface B of the light guide plate 100, such that the exit angle θ of the exiting light of the metal grating 300 is uniform. In this way, the transmission route by total reflection of the light moderated by diffraction by the metal grating 300 in the light guide plate 100 may be more consistent.

According to the embodiment of the present disclosure, a specific type of the sub-metal grating 310 is not particularly limited as long as the sub-metal grating 310 of this type may effectively control a diffraction angle of the exiting light, and those skilled in the art may select it correspondingly according to the specific transmission route by total reflection in the light guide plate 100. In some embodiments of the present disclosure, the sub-metal grating 310 may be a stepped grating. A grating period d, a step height s, and a duty ratio b/d of each of the metal sub-gratings 310 are determined according to the exit angle θ. In this way, through a partition optimization design of characteristic parameters of the respective metal sub-gratings 310 at different positions, a reflective diffraction effect of a same exit angle θ may be obtained at different incident angles, and at the same time, it may also be ensured that the multi-angle light incident on the area of each sub-metal grating 310 may be modulated by diffraction with high efficiency to satisfy the total reflection condition.

In some specific examples, referring to FIG. 7a, a sub-metal grating 310 of a stepped grating kind is filled between the steps thereof with a material of the same refractive index as the light guide plate 100. In this way, the incident light in the light guide plate 100 may be diffracted directly on the surface of the sub-metal grating 310, which may cause the range of the diffraction angle θ to be smaller, thereby further improving the luminous efficiency of the exiting light. In some other specific examples, referring to FIG. 7b, a sub-metal grating 310 of a stepped grating kind is filled between the steps thereof with air, so that the incident light in the light guide plate 100 may be diffracted only on the surface of the steps of the sub-metal grating 310 which may also achieve the effect of reflective diffraction. It should be noted that, referring to FIGS. 7a and 7b, since the grating diffraction has effects of multiple orders of diffraction (for example, zero order RO, reflective positive one order R+1 and reflective negative one order R−1), the reflective negative one-order of the diffracted light is used herein. In this way, a diffracted light with a certain angle (e.g, 65°) and an energy of a highest order may be obtained, and diffracted light of other orders may be absorbed by an absorbing layer due to different diffraction angles, which may be ignored.

According to the embodiment of the present disclosure, a specific order of the sub-metal grating 310 is not particularly limited, and for example, a second order or a fourth order etc. may be designed correspondingly by those skilled in the art according to the specific grating coupling efficiency as required. In some embodiments of the present disclosure, the orders of the sub-metal grating 310 of the stepped grating kind may be four orders (N=4) or more. Thus, the grating coupling efficiency may be increased by more than 20% compared with a condition of two orders, but corresponding production costs and process difficulties will be increased.

In some other embodiments of the present disclosure, the orders of the sub-metal grating 310 of the stepped grating kind may be two orders (N=2). Thus, for a light source that may emit a light with a wavelength λ=532 nm, the exit angle of the metal grating 300 may be determined to be about 61°~75°, and the grating coupling efficiency of the metal grating is about 35%~56%. As compared with a media grating of a media material with a high refractive index, the coupling efficiency may be doubled.

In some specific examples, when the medium filled between the steps of the sub-metal grating 310 is the same material as the light guide plate 100, the characteristic parameters of each sub-metal grating 310 (including the grating period d, the step height s, and the duty ratio b/d). As shown in Table 1, a reflective diffraction effect of an average grating coupling efficiency of about 48.7% and a diffraction angle range of about 61°~75° is obtained.

TABLE 1

Design results of the stepped grating of the second order
in which the filling medium between the steps of the sub-metal
grating is the same material as the light guide plate.

| Incident Angle | Grating Period d | Step Height s | Duty Ratio b/d | Grating Coupling Efficiency | Diffraction Angle range |
|---|---|---|---|---|---|
| 0°-5° | 430 nm | 105 nm | 53% | 36.2% | 61°-75° |
| 5°-10° | 480 nm | 107 nm | 57% | 44.2% | 61°-75° |
| 10°-15° | 545 nm | 89 nm | 58% | 55.6% | 61°-74° |
| 15°-20° | 625 nm | 91.7 nm | 58.5% | 48.4% | 61°-74° |
| 20°-25° | 730 nm | 102.5 nm | 41.5% | 50.1% | 61°-73° |
| 25°-30° | 860 nm | 112.3 nm | 52.7% | 50.8% | 61°-73° |
| 30°-35° | 1060 nm | 105.3 nm | 61.3% | 45.8% | 61°-72° |
| total | | | | 48.7% | 61°-75° |

In other specific examples, when the medium filled between the steps of the sub-metal grating 310 is air, the characteristic parameters of each of the metal sub-gratings 310 are shown in Table 2. Thus, a reflective diffraction effect of an average grating coupling efficiency of about 49.5% and a diffraction angle range of about 61°~75° is obtained.

TABLE 2

Design results of the stepped grating of the second order in which the
filling medium between the steps of the sub-metal grating is air.

| Incident Angle | Grating Period d | Step Height s | Duty Ratio b/d | Grating Coupling Efficiency | Diffraction Angle Range |
|---|---|---|---|---|---|
| 0°-5° | 430 nm | 140 nm | 62% | 45.8% | 61°-75° |
| 5°-10° | 480 nm | 140 nm | 63% | 50% | 61°-75° |
| 10°-15° | 545 nm | 186 nm | 64% | 49.4% | 61°-74° |
| 15°-20° | 625 nm | 180 nm | 48.7% | 50.2% | 61°-74° |
| 20°-25° | 730 nm | 204 nm | 47.3% | 50.7% | 61°-73° |
| 25°-30° | 860 nm | 223 nm | 57% | 50.85% | 61°-73° |
| 30°-35° | 1060 nm | 261 nm | 44.4% | 49.3% | 61°-2° |
| total | | | | 49.5% | 61°-75° |

According to the embodiments of the present disclosure, the specific number of the metal sub-gratings 310 in the metal grating 300 is not particularly limited, and those skilled in the art may select and adjust the specific number correspondingly according to the range of the incident angle of the metal grating 300 that needs to be diffracted. In some embodiments of the present disclosure, each of the sub-metal grating 310 corresponds to a case where the incident angle range difference is 5°. In this way, those lights emitted from the light source 100 to the metal grating 400 at the incident angle ranging between −60° and 60° may be modulated, so that most of the light in the Langmuir distribution from the LED light source may be reflected and diffracted.

According to an embodiment of the present disclosure, referring to FIG. 8 or FIG. 9, the edge-lit type backlight module may further include: a plurality of light output gratings 400; and the plurality of light output gratings 400 are disposed on the first surface A of the light guide plate 100 at intervals, or are disposed on the second surface B of the light guide plate 100 at intervals. In this way, an edge-lit type backlight module of a reflective light-exiting type or a transmissive light-exiting type may be obtained. In some embodiments of the present disclosure, referring to FIG. 9, a plurality of light output gratings 400 are disposed on the second surface B of the light guide plate 100 at intervals, so that an edge-lit type backlight module of the transmissive light exiting type may be obtained.

According to the embodiment of the present disclosure, the specific material of the light output grating 400 is not particularly limited, and a transparent medium with a high refractive index which is commonly used in the prior art may be used, and those skilled in the art may make an appropriate choice according to the specific manner of light exiting of the edge-lit type backlight module. In some embodiments of the present disclosure, the material of the light output grating 400 may be a transparent media material with a refractive index of about 2.0. In this way, a more appropriate light exiting angle of the light output grating 400 may be obtained.

Figure 10:
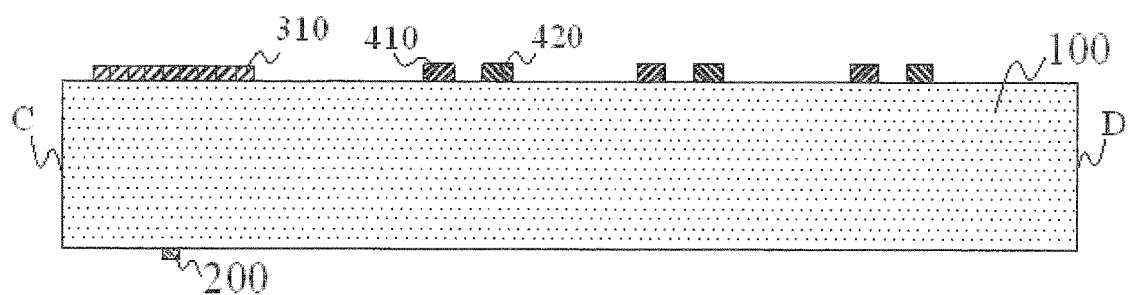
FIG. 10 is a schematic structural diagram of an edge-lit type backlight module according to another embodiment of the present disclosure, in which respective light output grating includes a first light output sub-grating and a second light output sub-grating that are disposed at intervals.

According to an embodiment of the present disclosure, referring to FIG. 10, each of the light output grating includes a first light output sub-grating 410 and a second light output sub-grating 420; the first light output sub-grating 410 is disposed close to the first end C, and the minimum exit angle of the light exiting one end of the first light output sub-grating 410 close to the first end C is no less than 0°; and the second light output sub-grating 420 is disposed away from the first end C, and the maximum exit angle of the light exiting one end of the second light output sub-grating 420 away from the first end C is not greater than 0°. It should be noted that, since the light source 200 is disposed close to the first end C of the light guide plate, the light emitted from the light source 200 is diffracted by the metal grating 300 and then is transmitted by total reflection from the first end C to the second end D of the light guide plate 100. Therefore it may be deemed that the incident light is incident on the light output sub-grating in a direction from the first surface A towards the first end C to each of the sub-light output grating, and the exiting light of each of the light output sub-grating from the second surface B towards the second end D has an angle range of about 0°~90°, and the angle from the second surface B towards the first end C ranges from about 0°~−90°. In this way, by designing the respective light-emitting directions of the first light output sub-grating 410 and the second light output sub-grating 420, a constant width light output mode or a convergent light output mode of the light output grating 400 may be obtained. As compared with the collimate light output mode in which the light exiting angle is ±7°, the width of the light shielding layer 800 that is disposed in one-to-one correspondence with the light output grating 400 may be effectively reduced, and light leakage of the light shielding layer may also be avoided.

In some embodiments of the present disclosure, referring to FIG. 10, there is a gap between the second light output sub-grating 420 and the first light output sub-grating 410. In this way, it is hollow between the first light output sub-grating 410 and the second light output sub-grating 420, so that a better effect of superposition of the sub-light paths of the light output grating 400 may be obtained.

Figure 12:
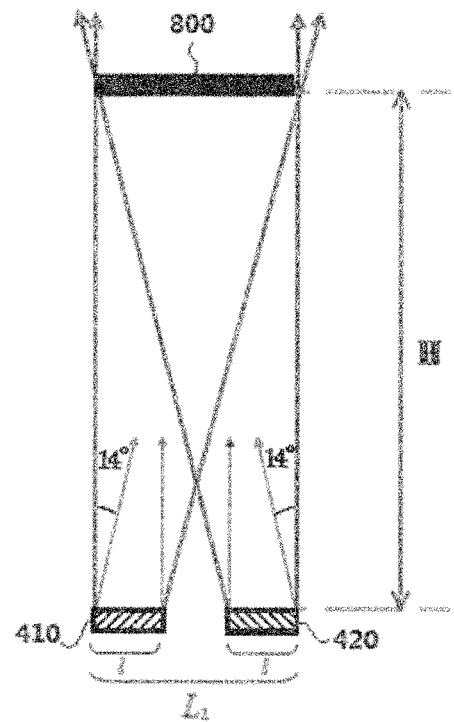
FIG. 12 is a schematic diagram of an optical path principle of a light exiting path of a light output grating according to an embodiment of the present disclosure.

In some specific examples, referring to FIG. 12, when the minimum exit angle of the light emitted from one end of the first light output sub-grating 410 close to the first end C is equal to 0°, and the maximum exit angle of the light emitted from an end of the second light output sub-grating 420 away from the first end C is equal to 0°, a constant width light output effect of the light output grating 400 may be obtained. For an angle range of the incident angle of about 57°~76°, the grating periods d of the two sub-light output gratings are shown in Table 3. Thus, the exit angle range of the first light output sub-grating 410 of about 0°~14° and the exit angle range of the second light output sub-grating 420 of about −15°~0° may be obtained, so that the light output grating 400 may achieve a constant width light output effect. Also, the width 1 of the two sub-light output gratings 410 and 420 and the highest placement height H of the light shielding layer 800 may be adjusted, and) $H=(L_1-1)/(\tan 14°)$.

TABLE 3

Parameters of the two sub-light output gratings in a constant width light output mode

| Sub-light Output Grating | Grating Period | Diffraction Angle Range |
|---|---|---|
| first sub-light output grating | 440 nm | 0°~14° |
| second sub-light output grating | 350 nm | −15°~0° |

Figure 13:
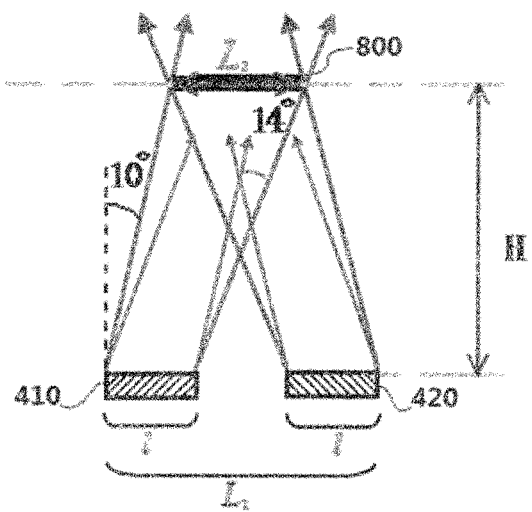
FIG. 13 is a schematic diagram of an optical path principle of a light exiting path of a light output grating according to another embodiment of the present disclosure.

In some other specific examples, referring to FIG. 13, when the minimum exit angle of light emitted from one end of the first light output sub-grating 410 close to the first end is greater than 0°, and the maximum exit angle of the light emitted from one end of the second light output sub-grating 420 away from the first end C is less than 0°, a convergent light output effect of the light output grating 400 may be obtained. For the angle range of the incident angle of about 57°~76°, the grating periods d of the two sub-light output gratings are shown in Table 4, so that the first light output sub-grating 410 may obtain the exit angle range of about 10°~23° and the second light output sub-grating 420 may obtain the exit angle range of about −26°~−10°, so that the light output grating 400 may achieve the effect of a converging light. Also, the width 1 of the two sub-light output gratings 410 and 420 and the highest placement height H of the light shielding layer 800 may be adjusted, and $H=(L_1-1)/[\tan(10°+14°)+\tan 10°]$.

TABLE 4

Parameters of the two sub light output gratings in a convergent light output mode

| Sub-light Output Grating | Grating Period | Diffraction Angle Range |
|---|---|---|
| First Sub-light Output Grating | 525 nm | 10°~23° |
| Second Sub-light Output Grating | 308 nm | −10°~−26° |

Figure 11:
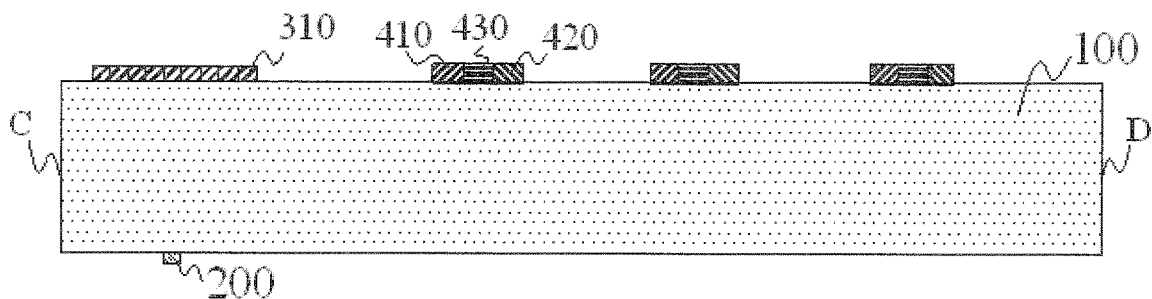
FIG. 11 is a schematic structural diagram of an edge-lit type backlight module according to another embodiment of the present disclosure, in which a third light output sub-grating is disposed between the first light output sub-grating and the second sub-light output grating.

In some other embodiments of the present disclosure, referring to FIG. 11, each of the light output grating 400 may further include a third light output sub-grating 430, and the third light output sub-grating 430 is disposed between the first light output sub-grating 410 and the second light output sub-grating 420. In this way, the first light output sub-grating 410 and the second light output sub-grating 420 may be disposed on either side of the collimated third light output sub-grating 430 respectively, and the entire light output grating 400 may also achieve a constant width light output effect.

Figure 14:
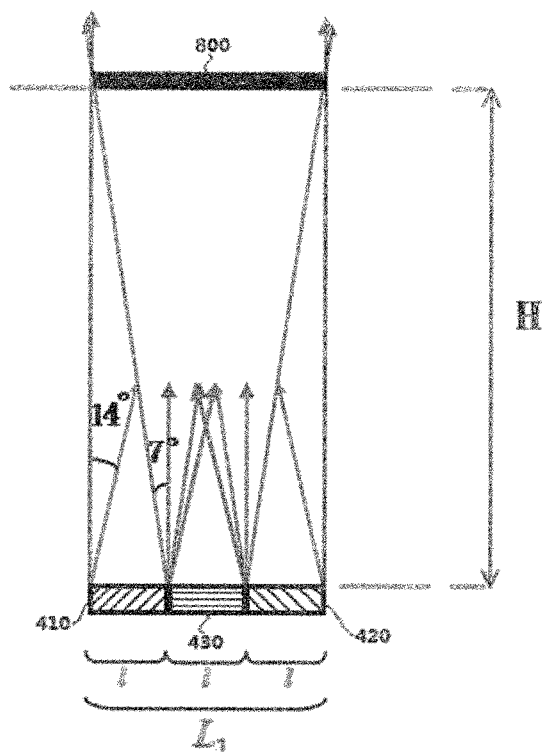
FIG. 14 is a schematic diagram of an optical path principle of a light exiting path of a light output grating according to another embodiment of the present disclosure.
Figure 15A:
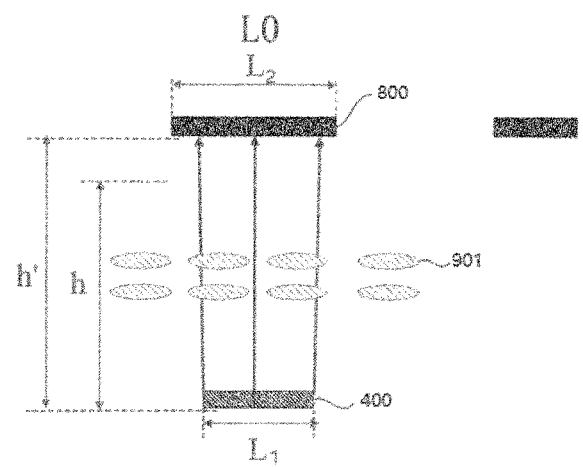
FIG. 15a is a schematic diagram of a display principle of a liquid crystal layer in a dark state L0 according to an embodiment of the present disclosure.
Figure 15B:
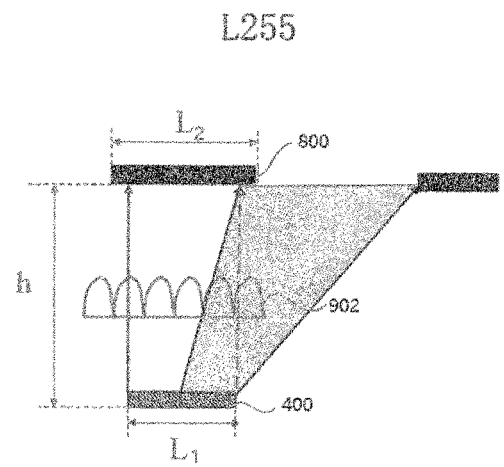
FIG. 15b is a schematic diagram of a display principle of a liquid crystal layer in a bright state L255 according to an embodiment of the present disclosure.

In some other specific examples, referring to FIG. 14, when the minimum exit angle of the light emitted from one end of the first light output sub-grating 410 close to the first end C is equal to 0° and the maximum exit angle of the light emitted from one end the second light output sub-grating 420 away from the first end C is equal to 0°, a constant width light output effect of the light output grating 400 may also be obtained. For an incident angle range of about 57°~76°, the grating period d of the three sub-light output gratings is shown in Table 5. Thus, the exit angle range of the first light output sub-grating 410 is about 0°~14°, that of the second light output sub-grating 420 is about −15°~0° and that of the third light output sub-grating 430 is about −15°~0°, so that a constant width light output effect of the light output grating 400 may also be obtained. Also, the highest placement height H of the light shielding layer 800 may be adjusted, and $H=(L_1/3)/(\tan 7°)$.

TABLE 5

Parameters of the three sub-light output gratings in a constant width light output mode

| Sub-light Output Grating | Grating Period | Diffraction Angle Range |
|---|---|---|
| Sub-light Output Grating | 440 nm | 0°~14° |
| Sub-light Output Grating | 350 nm | −15°~0° |

TABLE 5-continued

Parameters of the three sub-light output gratings
in a constant width light output mode

| Sub-light Output Grating | Grating Period | Diffraction Angle Range |
|---|---|---|
| Sub-light Output Grating | 390 nm | −7°~7° |

According to the embodiments of the present disclosure, specific groove depths and duty ratios of the two sub-light output gratings 410 and 420 are not particularly limited, and those skilled in the art may adjust the diffraction efficiencies of the two sub-light output gratings 410 and 420 to be close to each other by adjusting the groove depths and the duty ratios, which will not be described here.

According to an embodiment of the present disclosure, the difference between the width $L_2$ of the light shielding layer 800 arranged corresponding to the light output grating 400 and the width $L_1$ of the light output grating 400 is not greater than 2 μm. In this way, As compared with the light output grating only adopting the collimated light output mode, the width $L_2$ of the light shielding layer 800 may be effectively reduced, referring to FIG. 15b, such that the light energy loss caused by the light shielding layer 800 may be significantly reduced, and a pixel size is reduced and a specific number of pixels (PPI) is increased, the display effect may be improved, and referring to FIG. 15a, the problem of light leakage of the light shielding layer 800 due to process error may also be avoided.

In some embodiments of the present disclosure, referring to FIG. 14, the width of the light shielding layer 800 is the width $L_1$ of the light output grating 400 (or $L_1$+2 μm, taking the process error into account). As such, in the bright state L255, the light energy absorbed by the light shielding layer 800 may be significantly reduced, so that the light energy utilization rate may be improved. In other embodiments of the present disclosure, referring to FIG. 12, the width of the light shielding layer 800 is the width $L_1$ of the light output grating 400. As such, in the bright state L255, the light energy absorbed by the light shielding layer 800 may be significantly reduced, so that the light energy utilization rate may be improved. In other embodiments of the present disclosure, referring to FIG. 13, the width L2 of the light shielding layer 800 is $L_2=L_1-2H/\tan 10°$. In this way, in the bright state L255, the light energy absorbed by the light shielding layer 800 may be significantly reduced, so that the light energy utilization rate may be improved.

According to the embodiments of the present disclosure, the specific material of the light guide plate 100 is not particularly limited, as long as the light guide plate 100 of the material has transparency and total reflectivity, and those skilled in the art may select the specific material according to the specific size of the edge-lit type backlight module. In some embodiments of the present disclosure, the material of the light guide plate 100 may be selected from indium tin oxide (ITO) or silicon nitride ($Si_3N_4$). In this way, the total reflection effect using the above transparent media material is better. In some specific examples, the material of the light guide plate 100 may be a transparent media material having a refractive index of about 1.5. According to embodiments of the present disclosure, the specific thickness of the light guide plate 100 is also not particularly limited, and may be correspondingly designed according to the specific design of the edge-lit type backlight module. In some embodiments of the present disclosure, the light guide plate 100 may have a thickness of 1 to 100 μm. In some specific examples, the thickness of the light guide plate 100 may be about 10 times the thickness of the LED light source. In this way, a more suitable exit angle of the metal grating 300 and an exit angle of the light output grating 400 may be obtained.

According to the embodiment of the present disclosure, the specific type of the light source 200 is not particularly limited, as long as the refractive index of a light bar of the light source 200 of this kind is lower than the refractive index of the light guide plate 100, it may be selected correspondingly according to the according to requirements of the edge-lit type backlight module to the light and the specific requirements to the light guide plate 100. In some embodiments of the present disclosure, the light source 200 may be an LED light source or a Micro LED light source. Thus, the energy consumption of the light source 200 of the above type is lower.

Figure 16:
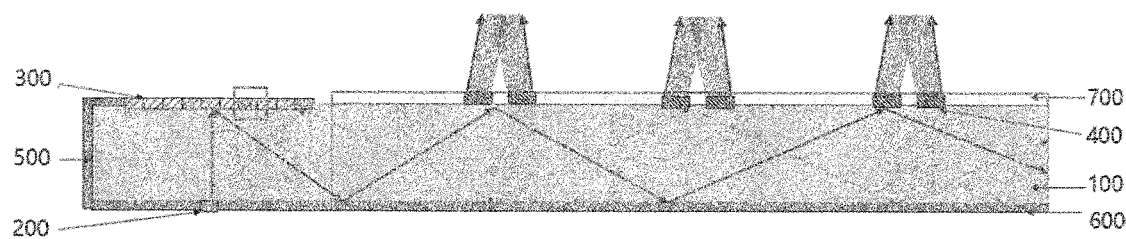
FIG. 16 is a schematic diagram of a principle of a converging light output mode of an edge-lit type backlight module according to an embodiment of the present disclosure.
Figure 17:
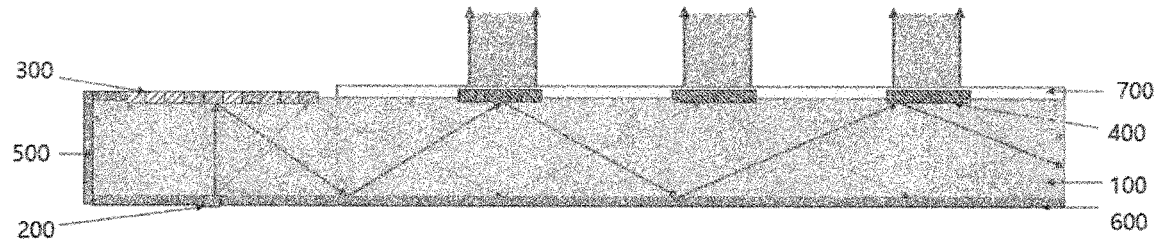
FIG. 17 is a schematic diagram of a principle of a constant width light output mode of an edge-lit type backlight module according to an embodiment of the present disclosure.

According to an embodiment of the present disclosure, referring to FIG. 16 or FIG. 17, the edge-lit type backlight module may further include a reflective layer 500 disposed at a first end of the light guide plate 100. As such, after the light diffracted by the metal grating 300 toward the first end is reflected, the light are further transmitted by total reflection in the light guide plate 100 toward the second end, so that the utilization rate of light emitted from the light source 100 may be improved. In some embodiments of the present disclosure, the reflective layer 500 may be a metal film or a multilayer media film. In this way, the reflective effect is better, so that utilization of light emitted by the light source 100 is more efficient.

According to an embodiment of the present disclosure, referring to FIG. 16 or FIG. 17, the edge-lit type backlight module may further include an absorber layer 600 covering the first surface of the light guide plate 100. Since the negative one order (R−1) of the diffracted light of the metal grating 300 is mainly used, a diffracted light of a certain angle (for example, 65°) and the highest order may be obtained, and the diffracted light of other orders are absorbed by the absorber layer 600 because the diffraction angles are different and they may not be emitted out, so that stray light of other orders may be filtered without affecting collimation degree of the diffracted light of negative one order. In some embodiments of the present disclosure, the material of the absorbing layer 600 may be a commonly used black absorbing material, and thus the filtering effect of stray light is better.

According to an embodiment of the present disclosure, referring to FIG. 16 or FIG. 17, the edge-lit type backlight module may further include a filling layer 700 that covers the second surface of the light guide plate 100. In this way, the filling layer may assist the realization of the total reflection effect of the light guide plate 100. In some embodiments of the present disclosure, the material of the filling layer 700 is a material with a low refractive index and a thickness greater than 1 micrometer. In this way, it is ensured that the total reflection angle within the light guide plate 100 may be sufficiently large.

In summary, according to an embodiment of the present disclosure, the present disclosure proposes an edge-lit type backlight module in which the metal grating is disposed opposite to a light source thereof, and the light emitted from the light source is modulated by diffraction and then is transmitted by the total reflection within the optical plate in a certain small angle range. As compared with a media grating using a media material with a high refractive index, the grating coupling efficiency may be doubled, thereby improving the light efficiency of the edge-lit type backlight module.

In another aspect of the present disclosure, the present disclosure proposes a display device. According to an embodiment of the present disclosure, the display device includes the above-described edge-lit type backlight module.

According to embodiments of the present disclosure, the specific type of the display device is not particularly limited, and those display devices commonly used in the field may be selected, and those skilled in the art may select the specific type of the display device correspondingly according to the specific use requirements of the display device, which will not be repeated.

It should be noted that, in addition to the above edge-lit type backlight module, the display device also includes other necessary components and structures. Taking an LCD display as an example, it specifically comprises, for example, a display panel, a housing, etc., and those skilled in the art may supplement correspondingly according to the specific use requirements of the display device, which will not be repeated here.

In summary, according to embodiments of the present disclosure, the present disclosure proposes a display device, in which the light output effect of the edge-lit type backlight module is higher and the power consumption of the display device is lower. Those skilled in the art may understand that the features and advantages described in the foregoing for the edge-lit type backlight module are still applicable to the display device, which will not be repeated herein.

In the description of the present disclosure, it is to be understood that the terms "length", "width", "thickness", "upper", "lower", "inner", "outer", etc. indicate the orientation or positional relationship based on those in the Figures. These orientations or positional relationships are only for convenience of description of the present disclosure and simplified description, and do not indicate or imply that the questioned device or element must have such a specific orientation, be constructed and operated in such a specific orientation, and thus should not be understood as a limitation to the present disclosure.

Furthermore, the terms "first" and "second" are used for descriptive purposes only, and are not to be construed as indicating or implying relative importance or implicitly indicating the number of indicated technical features. Thus, features defined as "first", "second" may explicitly or implicitly include at least one such feature. In the description of the present disclosure, the meaning of "plurality" is at least two, such as two, three, etc., unless specifically and specifically defined otherwise.

In the description of the present specification, the description referring to the terms "one embodiment", "some embodiments", "an example", "a specific example", or "some examples" or the like means a specific feature described in conjunction with the embodiment or example. Structures, materials, or features are included in at least one embodiment or example of the present disclosure. In this specification, the schematic representation of the above terms does not necessarily have to refer to the same embodiment or example. Furthermore, the particular features, structures, materials, or characteristics described may be combined in any suitable manner in any one or more of the embodiments or examples. In addition, those skilled in the art may combine and combine the different embodiments or examples described in this specification and features of different embodiments or examples without conflicting with each other.

Although embodiments of the present disclosure have been shown and described above, it will be understood that the above embodiments are exemplary and not to be construed as limiting the present disclosure, and that those of ordinary skill in the art may, within the scope of the present disclosure, The embodiments are subject to variations, modifications, substitutions and variations.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An edge-lit type backlight module, comprising:
a light guide plate having a first surface and a second surface opposite to each other, a first end and a second end opposite to each other, the first end and second end having a distribution orientation parallel to the first surface;
a light source being directly disposed on the first surface of the light guide plate and being close to the first end of the light guide plate; and
a metal grating disposed on the second surface of the light guide plate for the light emitted by the light source being modulated by diffraction by the metal grating and then being transmitted by total reflection in the light guide plate, an orthographic projection of the metal grating on the first surface covering an orthogonal projection of the light source on the first surface,
wherein the metal grating comprises a plurality of metal sub-gratings disposed side by side in a same layer on the second surface of the light guide plate so as to diffract non-parallel incident light to the metal grating and then obtain a uniform exit angle of the exit light of the metal grating.

2. The edge-lit type backlight module according to claim 1, wherein the metal grating is made of aluminum metal.

3. The edge-lit type backlight module according to claim 1, wherein the plurality of the metal sub-gratings are stepped gratings whose grating period, whose step height, and whose duty ratio are determined depending on the exit angle.

4. The edge-lit type backlight module according to claim 3, wherein a material having a same refractive index as that of the light guide plate is filled between steps of the metal sub-gratings.

5. The edge-lit type backlight module according to claim 3, wherein there is a gap between the adjacent steps of the metal sub-gratings.

6. The edge-lit type backlight module according to claim 1, wherein the exit angle of the metal grating ranges from about 61°~75°, and a grating coupling efficiency of the metal grating ranges from about 35-56%.

7. The edge-lit type backlight module according to claim 1, further comprising:
a plurality of light output gratings disposed on the first surface at intervals or on the second surface at intervals.

8. The edge-lit type backlight module according to claim 7, wherein the light output gratings output the light transmitted by total reflection within the light guide plate in a light-output manner of a constant width light output or a convergent light output.

9. The edge-lit type backlight module according to claim 7, wherein each of the light output gratings comprises:

a first sub-light output grating disposed close to the first end, and a minimum exit angle of the light exiting from an end of the first light output sub-grating close to the first end is no less than 0°;

a second light output sub-grating disposed away from the first end, and a maximum exit angle of the light exiting from an end of the second light output sub-grating away from the first end is not greater than 0°.

10. The edge-lit type backlight module according to claim 9, wherein each of the light output gratings further comprises:

a third light output sub-grating disposed between the first light output sub-grating and the second sub-light output grating.

11. The edge-lit type backlight module according to claim 9, wherein there is a gap between the second light output sub-grating and the first sub-light output grating.

12. The edge-lit type backlight module according to claim 7, wherein a difference between a width of a light shielding layer disposed corresponding to the light output grating and a width of the light output grating is no greater than 2 microns.

13. The edge-lit type backlight module according to claim 7, wherein the material of the light output grating is a transparent media material with a refractive index of about 2.0.

14. The edge-lit type backlight module according to claim 1, wherein the light source is a LED light source, and a thickness of the light guide plate is about 10 times the thickness of the LED light source.

15. The edge-lit type backlight module according to claim 1, further comprising a reflective layer disposed at the first end.

16. The edge-lit type backlight module according to claim 1, further comprising an absorber layer disposed on the first surface.

17. The edge-lit type backlight module according to claim 1, further comprising a filling layer covering the second surface of the light guide plate.

18. A display device, comprising the edge-lit type backlight module according to claim 1.

* * * * *